United States Patent
Hashimoto

(10) Patent No.: US 6,339,192 B1
(45) Date of Patent: *Jan. 15, 2002

(54) THREE-PHASE BUS-BAR STRUCTURE HAVING NOISE-FILTERING FUNCTION

(75) Inventor: Yuji Hashimoto, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,695

(22) Filed: Dec. 11, 1998

(30) Foreign Application Priority Data

Dec. 12, 1997 (JP) .................................................. 9-362800

(51) Int. Cl.⁷ ...................................................... H02G 5/00
(52) U.S. Cl. ................ 174/72 B; 174/88 B; 174/149 B; 361/611; 361/638; 361/775; 439/212
(58) Field of Search ............................... 174/71 B, 72 B, 174/88 B, 99 B, 133 B, 149 B; 439/212; 361/775, 611, 637, 638, 648; 403/270

(56) References Cited

U.S. PATENT DOCUMENTS

| 3,349,291 | * | 10/1967 | Olashaw | ................ | 317/120 |
| 3,726,988 | * | 4/1973 | Davis | ................ | 174/68 B |
| 4,430,522 | * | 2/1984 | Bader | ................ | 174/72 B |
| 4,867,696 | * | 9/1989 | Demler et al. | ................ | 439/212 |
| 5,038,257 | * | 8/1991 | Agabekov | ................ | 362/219 |
| 5,055,059 | * | 10/1991 | Logstrup | ................ | 439/214 |
| 5,442,135 | * | 8/1995 | Faulkner et al. | ................ | 174/68.2 |
| 5,493,476 | * | 2/1996 | Burns | ................ | 361/735 |
| 5,619,014 | * | 4/1997 | Faulkner | ................ | 174/68.2 |
| 5,854,445 | * | 12/1998 | Graham et al. | ................ | 174/99 B |
| 5,866,848 | * | 2/1999 | Asselta et al. | ................ | 174/72 B |
| 6,034,861 | * | 3/2000 | Meiners et al. | ................ | 361/115 |

FOREIGN PATENT DOCUMENTS

| 55-53009 | 4/1980 | (JP) . |
| 61-8908 | 1/1986 | (JP) . |
| 3-81671 | 8/1991 | (JP) . |
| 5-48284 | 6/1993 | (JP) . |
| 9-162594 | 6/1997 | (JP) . |

* cited by examiner

*Primary Examiner*—Dean A. Reichard
*Assistant Examiner*—Adolfo Nino
(74) *Attorney, Agent, or Firm*—Foley & Lardner

(57) ABSTRACT

A bus bar in which the noise of an apparatus connected to a bus bar is absorbed by the frame to reduce the noise propagated and radiated from the power feed cable and in which the apparatus may be reduced in size to achieve space saving while being reduced in cost. A plurality of power source layers and a plurality of frame grounding layers are arranged neighboring to one another with dielectric layers in-between, while a plurality of frame grounding layers are arranged neighboring to each other with dielectric layers in-between to provide a multi-layered structure including the frame grounding layers. The frame grounding layers are contacted with a fastener with a casing of a frame apparatus in surface contact to constitute a stable grounding of low impedance, while absorbing the noise proper to the insulating layer by interlayer capacitative coupling.

10 Claims, 4 Drawing Sheets

THREE-PHASE BUS-BAR STRUCTURE HAVING NOISE-FILTERING FUNCTION

FIELD OF THE INVENTION

This invention relates to a bus-bar structure and, more particularly, to a bus-bar structure having a noise filtering function.

BACKGROUND OF THE INVENTION

There has so far been known a current feeding method in a frame apparatus employing a bus bar, in which a layered bus bar is secured via an insulator to the apparatus and interconnects a bus-bar frame grounding layer and a casing frame grounding by a frame grounding connection cable. FIG. 4 shows a typical conventional bus bar of this type in a perspective view.

In FIG. 4, 19 denotes a bus bar, 20 a vinyl band for securing the bus bar, 21 a bus bar support (supporting portion), 22 frame grounding for an apparatus casing and 23 denotes a frame grounding connection cable. That is, the bus bar 1 is secured to the a bus bar support 21 with a bus bar securing vinyl band 20 as an insulating material, whilst a frame grounding layer of the bus bar 19 is connected by the frame grounding connection cable 23 to the frame grounding layer of the bus bar 19 and to the casing frame grounding 22.

In the layered structure of this conventional bus bar, there lacked suitable means to absorb the noise. As another bus bar structure, there is proposed in, for example, the JP Patent Kokai JP-A-3-81671(1991), a power supplying structure to a circuit board including a power source, the circuit board for receiving the power from the power source, and a bus bar arranged on the circuit board.

SUMMARY OF THE DISCLOSURE

However, in the course of the investigations toward the present invention the following problems have been encountered. Namely, the conventional structure has the following inconveniences:

The first inconvenience is that, if a power feed line is connected to a noise-generating apparatus, the noise tends to be propagated over the power feed line to the bus bar and superimposed by the capacitative and inductive coupling of the bus bar on signals on the power feed line so as to be radiated from all power feed lines.

The reason is that the power feed route lacks in or suffers from shortage of a noise-filtering function.

The second inconvenience is that, although it might be possible to attempt to mount a noise filter independently of the bus bar configured for reducing the noise superimposed on the signals transmitted on the power feed system, it is necessary to provide a sufficient space to install therein plural large-sized noise filters and a stable grounding structure for grounding the noise filter if there are plural power feed lines of large current capacity and high voltage withstand properties.

The reason is that there lacks a space-saving type noise filter having large current capacity and high voltage withstand characteristics.

It is therefore an objective of the present invention to provide a bus bar in which the noise of the apparatus connected to the bus bar can be absorbed by the frame to reduce the noise propagated and radiated from the power feed cable and in which the structure may be reduced in size for space saving and cost reduction.

According to one aspect of the present invention, there is provided a bus bar structure having a noise filtering function, wherein a frame grounding layer of the bus bar is configured so that a frame grounding structure of the bus bar is via a low impedance connected to a frame of an apparatus, with the bus bar having a structure of absorbing the noise transmitted from the apparatus via a power feed cable.

According to a second aspect of the present invention, there is provided a bus bar structure having a noise filtering function wherein a frame grounding layer of the bus bar has a structure that is fastened to an frame of an apparatus in surface contact therewith, with the bus bar having a structure of absorbing the noise transmitted from the apparatus via a power feed cable.

In a third aspect of the present invention, there is provided a bus bar structure having a noise filtering function wherein a frame grounding layer of the bus bar is arranged adjacent to a power source layer and a power source grounding layer with a dielectric material in-between, and wherein the frame grounding layer of the bus bar is connected to a grounding frame of a casing of an apparatus.

In a fourth aspect of the present invention, there is provided a bus bar structure having a noise filtering function wherein a plurality of power feeding layers and frame grounding layers are arranged with dielectric layers in-between, the frame grounding layers are led out and bundled at least on one side or end, with the frame grounding layers being secured by fasteners to a frame of a casing of an apparatus in surface contact therewith to constitute a stable ground structure of low impedance to absorb the noise of the power feeding layers by inter-layer capacitative coupling.

Still further features of the present invention are disclosed in the dependent claims and are incorporated herein with reference threreto, on need.

PREFERRED EMBODIMENTS

According to a preferred embodiment of the present invention, there is provided a bus bar structure having a noise filtering function, wherein the bus bar structure has, in its layered structure, a plurality of frame grounding layers which are in surface contact with a casing of a frame apparatus by exchangeable set screws to constitute a stable grounding of low impedance to absorb the noise proper to a power feed layer by inter-layer capacitative coupling.

According to the present invention, in which the power feed layer and the frame grounding layer are intimately contacted with each other with a dielectric material interposed therebetween, stray inductance is significantly lowered to contribute to reduction of the broad-range noise through noise absorption in the low-impedance frame grounding structure.

DETAILED DESCRIPTION OF THE PREFERRED EMBODIMENTS

Figure 1:
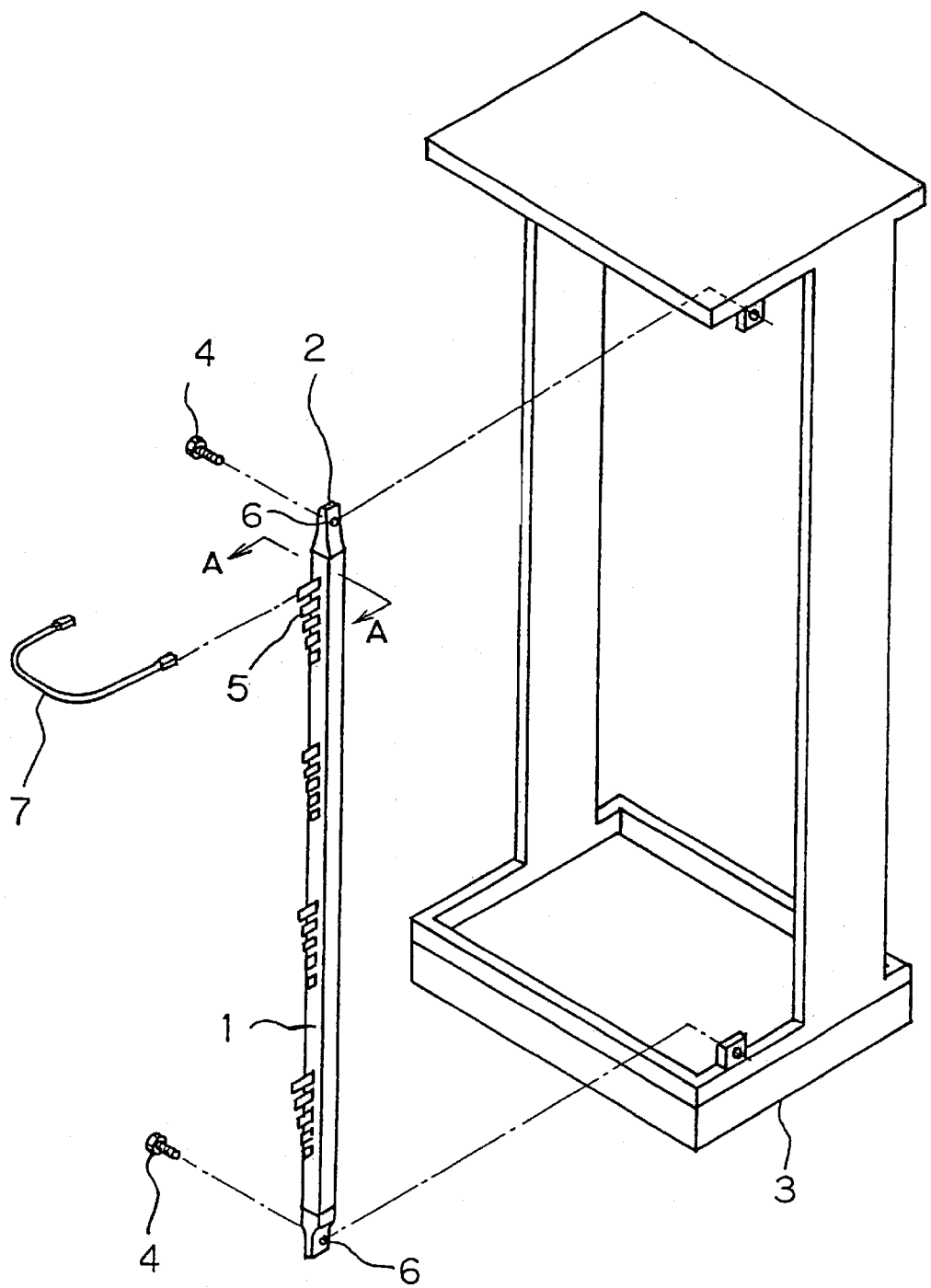
FIG. 1 is an exploded perspective view showing an embodiment of a bus bar structure having a noise filtering function according to the present invention.

Referring to the drawings, a preferred embodiment of the present invention will be explained in detail.

FIG. 1 shows an exploded perspective view showing the structure of an embodiment of the present invention. In FIG. 1, 1 denotes a bus bar, 2 a frame grounding layer, 3 a frame grounding structure of an apparatus casing, 4 a bolt, 5 a terminal, 6 a bolt hole and 7 denotes a power feed cable.

Referring to FIG. 1, showing an embodiment of the present invention, both longitudinal ends of the bus bar 1 are constituted solely by frame grounding layers 2, which are secured to the frame grounding structure 3 of the apparatus housing by bolts 4 in planar contact therewith. The apparatus housing constitutes the frame ground in this case.

Since the frame grounding layer 2 of the bus bar 1 is strongly fastened to the frame grounding structure 3 of the entire apparatus by the bolts 4 passed through the bolt holes 6, the electrical contact resistance is minimized.

Figure 2:
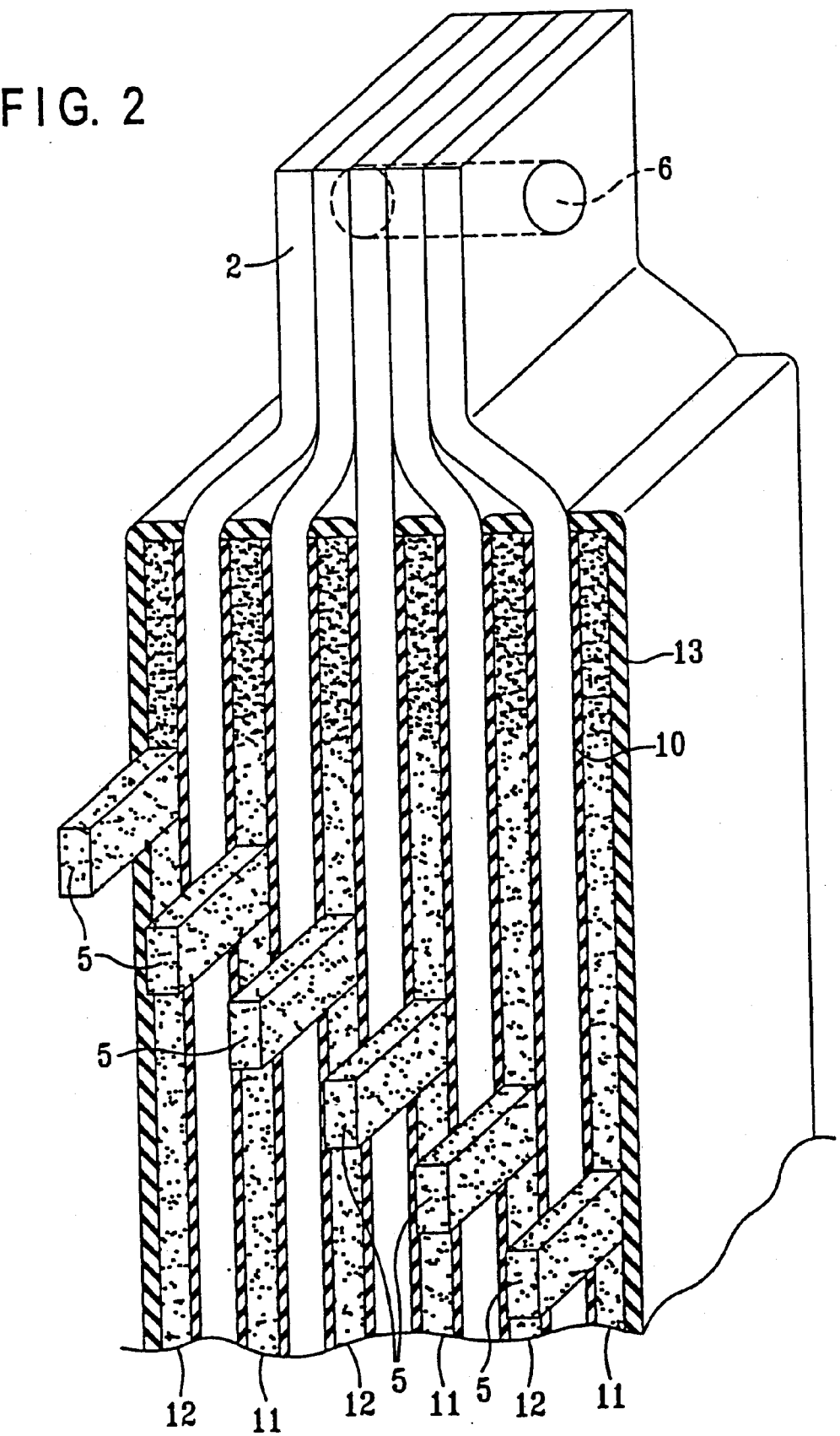
FIG. 2 is a cross-sectional side view taken along the line A—A in FIG. 1.

FIG. 2 shows a cross-sectional side view of the bus bar 1 looking from the direction indicated by arrows A in FIG. 1. Referring to FIG. 2, the structure of a surface contact portion is designed so that plural frame grounding layers 2 of the bus bar are superimposed to minimize the electrical contact resistance between the neighboring layers.

Since the frame grounding layers 2 are superimposed on power source grounding layers 11 and the power source layers 12, with the dielectric layers 10 in-between, the noise propagated to the power source grounding layers 11 and the power source layers 12 is absorbed by the frame grounding layers 2 fastened to the frame grounding structure 3 of the entire apparatus and which is thereby reduced in impedance.

Referring to the drawings, an example of carrying out the present invention is explained in detail.

Referring to FIGS. 1 and 2, a first example of the present invention is configured so that the frame grounding layers 2 of the bus bar 1 are directly fastened in surface contact with the frame grounding structure 3 of a frame apparatus. The bus bar 1 extends straight and has each bolt hole 6 on each end. Lead terminals 5 are led out, at the side, of each conductive layer (11, 12) for connection on with the power source or power source grounding etc.

The frame grounding structure 3 of the apparatus is configured so as to be secured to the frame grounding structure 3 of the bus bar 1 in surface contact therewith. The frame grounding layers 2 of the bus bar 1 are configured so as to have a surface contact with and for being secured to the frame grounding structure 3 of the apparatus.

The contact portions of the bus bar 1 and the frame grounding structure 3 are both planar and fastened to each other by bolts.

Referring to FIG. 2, the bus bar 1 has a layered structure in which the frame grounding layers 2 and the power source grounding layers 11 are arranged neighboring to one another with dielectric layers 10 in-between and in which the frame grounding layers 2 and the power source layers 12 are arranged neighboring to one another with the dielectric layers 10 in-between. Each of the dielectric layers 10 is interposed between two other conductive layers, i.e., between two layers 11 and 2, and between two layers 2 and 12, respectively.

The bus bar 1 has its electrically conductive portions (layers) formed of a metal having high electrical conductivity. The plating metal may preferably be iron or copper.

The metal layer may be formed, e.g., by plating.

Figure 3:
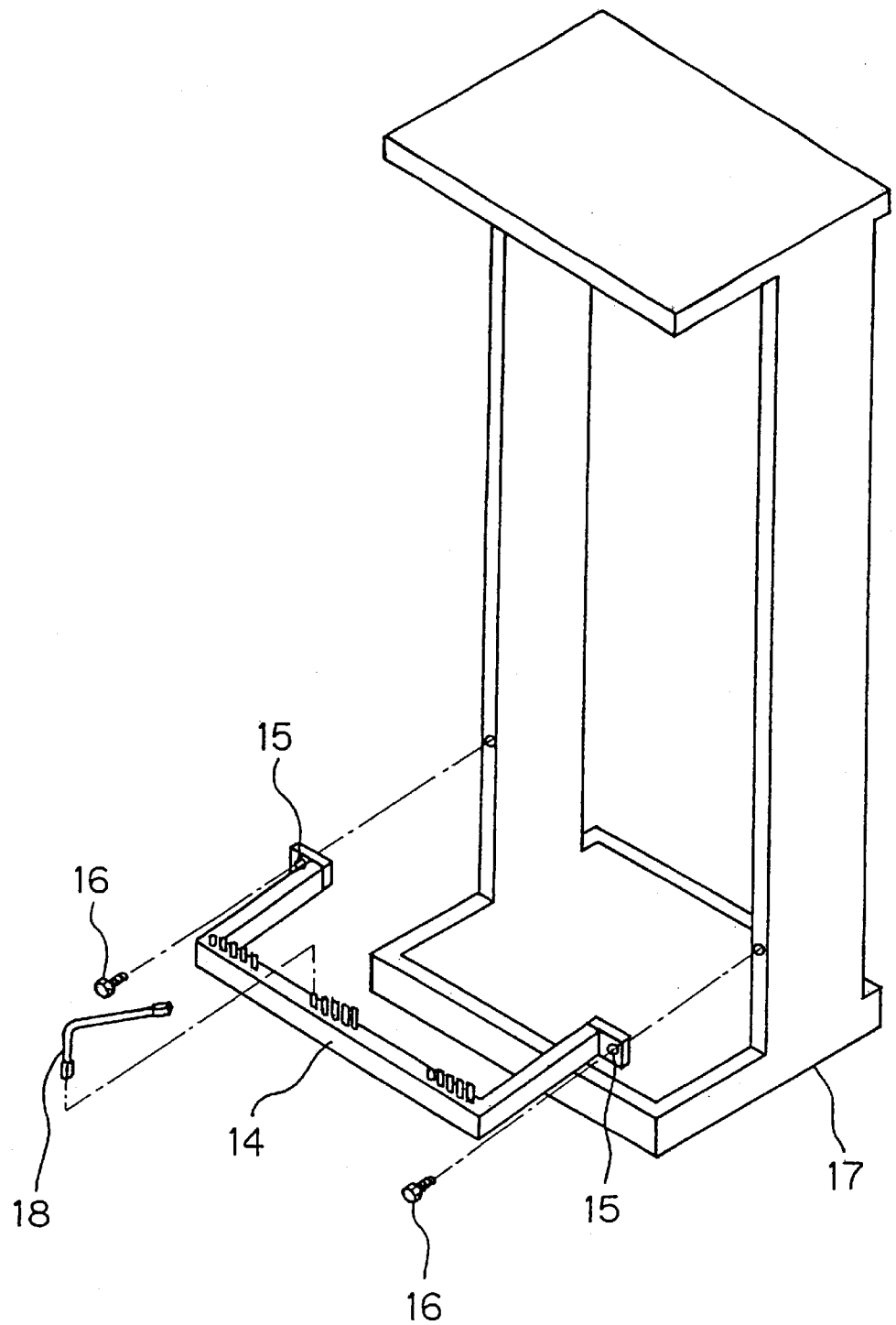
FIG. 3 is a perspective view of a modification according to the present invention.
Figure 4:
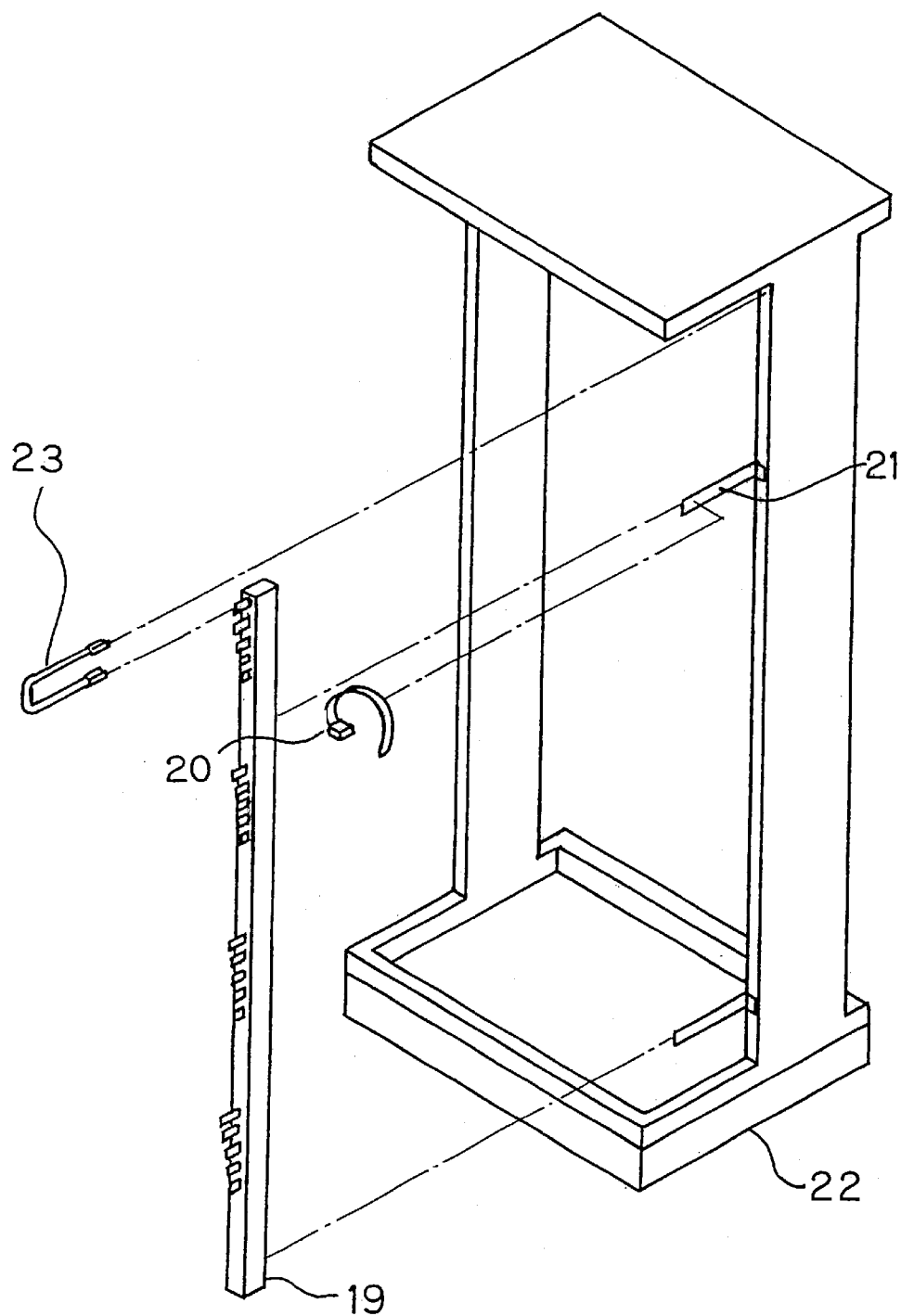
FIG. 4 is a perspective view showing a conventional bus bar structure.

Referring to the drawings, a second example of execution of the present invention will be explained in detail. FIG. 3 shows a perspective view showing the structure of the second example of the present invention.

Referring to FIG. 3, the shape of a bus bar 14 is a bent shape, particularly, U-shape, instead of a bar shape as in the first example, in order to provide a shorter length of a power feed cable 18. The bus bar 14 has the shape of a letter U, both sides of which are provided at the proximal ends thereof with bolt holes 15 to permit fastening of the bus bar to a frame grounding structure 17 of the casing of the apparatus with bolts 16.

The meritorious effects of the invention are summarised as follows.

The present invention, described above, has the following advantages:

The first meritorious effect of the present invention is that the noise generated in the apparatus connected to a bus bar is absorbed by the frame. This diminishes the noise propagated and radiated from the power feed cable.

The reason is that, in the present invention, the low-impedance frame grounding layers, kept in surface contact with the frame, and the power feeding layers, are superimposed in plural layers, with the result that the noise propagated to the power feed layers is absorbed by the inter-layer capacitative coupling to the frame grounding structure.

The second meritorious effect of the present invention is that a noise filter mounted on a power feed port of the apparatus can be deleted or replaced by a noise filter of a reduced attenuation. This assures space saving as well as size or cost reduction of the apparatus.

The reason is that the bus bar having the noise filtering function can absorb the noise in the apparatus.

It should be noted that other objectives of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A device, including a bus bar structure and an apparatus comprising:

a plurality of power supply conductors connected to a power source of said apparatus, a plurality of frame grounding conductors having a low impedance portion connected to a frame of said apparatus; and means, including an interleaved configuration of said plurality of power supply conductors and frame grounding conductors for absorbing noise transmitted from the apparatus connected to said bus bar structure, said noise being conducted via a power feed cable connected between said apparatus and said bus bar structure.

2. The device as recited in claim 1 wherein said plurality of frame grounding conductors are fastened to a frame of said external apparatus in surface contact with said frame.

3. The device as recited in claim 1 further comprising a dielectric layer disposed between each of said power supply conductors and said frame grounding conductors.

4. The device as recited in claim 3 further comprising a plurality of power source grounding conductors interleaved with said plurality of power supply conductors and said plurality of frame grounding conductors and additional dielectric layers wherein said additional dielectric layers are disposed between each adjacent power source grounding conductor and frame grounding layer.

5. A device including an apparatus and a bus bar comprising:
- a plurality of power supply conductors forming part of said bus bar and connected to a power source of said apparatus,
- a plurality of frame grounding conductors forming part of said bus bar and connected to a frame of said apparatus,
- a plurality of dielectric layers forming part of said bus bar and
- a plurality of power source grounding conductors forming part of said bus bar and connected to a power source ground of said apparatus,
- said plurality of power supply conductors, said plurality of frame grounding conductors, said plurality of dielectric layers and said plurality of power source grounding conductors superimposed on and interleaved with one another and arranged in layers, said bus bar configured in order of at least:
- a first power supply conductor,
- a first dielectric layer,
- a first frame grounding conductor,
- a second dielectric layer,
- a first power source grounding conductor,
- a third dielectric layer,
- a second frame grounding conductor,
- a fourth dielectric layer,
- a second power supply conductor,
- a fifth dielectric layer,
- a third frame grounding conductor,
- a sixth dielectric layer, and
- a second power source grounding layer.

6. The device as recited in claim 5 wherein said plurality of frame grounding conductors extend beyond an end region of said plurality of power supply conductors, said power source grounding conductors and said dielectric layers and said plurality of frame grounding conductors being physically grouped together and secured to a frame of said apparatus and in surface contact therewith to provide a low impedance path to absorb noise of the plurality of power supply conductors by inter-layer capacitance coupling.

7. A device including an apparatus and a bus bar comprising:
- a plurality of power supply conductors forming part of said bus bar and connected to a power source of said apparatus,
- a plurality of frame grounding conductors forming part of said bus bar and connected to a frame of said apparatus, and
- a plurality of dielectric layers forming part of said bus bar and disposed between and interleaved with an adjacent power supply conductor and frame grounding conductor, and
- wherein said plurality of frame grounding conductors extend beyond an end region of said plurality of power supply conductors and said plurality of dielectric layers, and said plurality of frame grounding conductors are physically grouped together and secured to a frame of said apparatus and in surface contact therewith to provide a low impedance path to absorb noise of the plurality of power supply conductors by inter-layer capacitance coupling.

8. The device as recited in claim 7, wherein said bus bar is in the shape of a straight rod and wherein said plurality of frame grounding conductors extent beyond both end regions of said rod and are physically grouped together beyond said end regions and secured to a frame of said apparatus and in surface contact.

9. The device as recite in claim 7, wherein said bus bar has a curved shape with two ends and said plurality of frame grounding layers extend beyond both ends and are physically grouped together and have planar end portions thereof for attachment to said apparatus.

10. The bus bar as recited in claim 9 wherein said curved shape is a U-shape.

* * * * *